A. P. Payson
Swing
No. 3,582. Reissued Aug. 3, 1869.
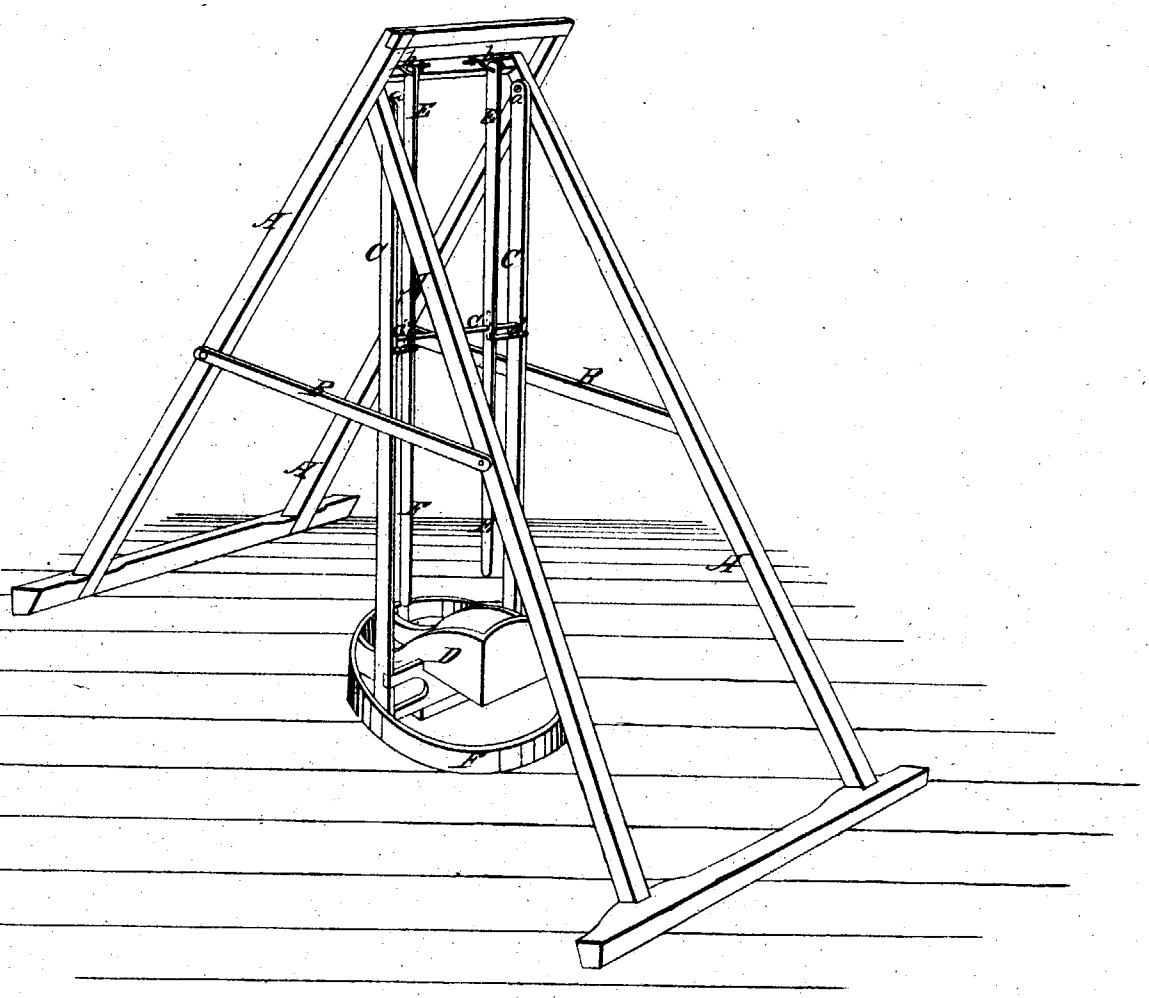
Witnesses.
G. W. McSmith
Geo. H. Strong.
Inventor.
Alonzo P. Payson

UNITED STATES PATENT OFFICE.

ALONZO P. PAYSON, OF SAN FRANCISCO, CALIFORNIA.

GYMNASTIC SWING.

Specification forming part of Letters Patent No. 66,038, dated June 25, 1867; Reissue No. 3,582, dated August 3, 1869.

*To all whom it may concern:*

Be it known that I, ALONZO P. PAYSON, of San Francisco, in the county of San Francisco and State of California, have invented a new and useful Improvement in Gymnastic Swings; and I do hereby declare that the following is a full, clear, and exact description thereof, which will enable others skilled in the art to make and use the same, reference being had to the accompanying drawing, forming part of this specification.

This invention relates to that class of swings which are so constructed that they may be impelled by persons occupying them; and it consists in the combination and arrangement of parts, as will be hereinafter specified.

The accompanying drawing represents a perspective view of a swing supported and operating according to my invention.

Similar letters of reference indicate corresponding parts.

A A represent the supporting-stands, which rest upon the ground and are connected together and strengthened by the transverse bars B B.

C C are the bars which support the seat D of the swing, which bars are suspended from the points *a*.

E E are motive-power levers, attached at their upper ends to short projecting arms *b b*, which arms are hinged to the supporting-frame so that they are allowed to rise and fall and accommodate themselves to the varying positions of the bars C C while those bars are in motion.

The levers E E are fastened to the bars C C by a rod (or by any other suitable device) at the point *c*, and they are kept in their proper places by the short arms *d d*. The levers E E may be attached to the center of motion (or at *a*) of the bars C C by making a slot at the point *c* to give the necessary play, in which case the short arms *b b*, to which they are attached above, may be dispensed with.

F represents a thin elastic hoop or band around the seat D, which, by its elasticity, prevents injury in case of contact with persons or objects. The advantages of this arrangement are that the person swinging is not dependent upon another to give him motion, but can propel himself by taking hold and working the levers E E, thus securing invigorating exercise while amusing himself.

Having thus described my invention, I claim as new and desire to secure by Letters Patent—

1. In combination with a swing, the motive-power levers E E, connected with the suspended bars C C, so that the person swinging may operate the swing thereby, substantially as described.

2. In combination with the seat of a swing, whether said seat is impelled by levers E E or not, the elastic hoop or band F, substantially as and for the purposes herein shown and described.

3. The combination of the bars C C, levers E E, seat D, and the protecting hoop F, with the supports A A, or their equivalents, when arranged substantially as and for the purposes described.

A. P. PAYSON.

Witnesses:

FRANK BLOCKLEY,
ALEX. F. ROBERTS.